Figure 1:
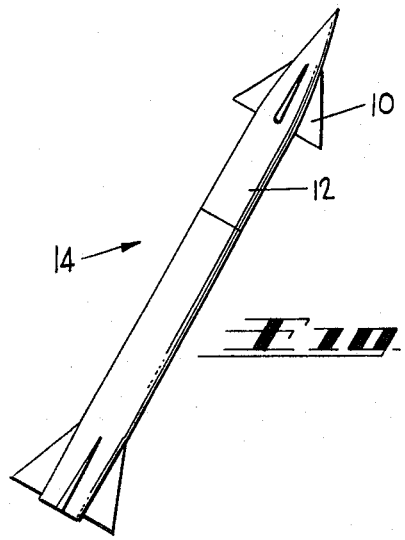

Nov. 22, 1966  H. NITIKMAN  3,286,956

MISSILE CONTROL SYSTEM

Original Filed Jan. 19, 1961  2 Sheets-Sheet 1

INVENTOR.
HERSCHEL NITIKMAN
BY
Edwin Coates
ATTORNEY

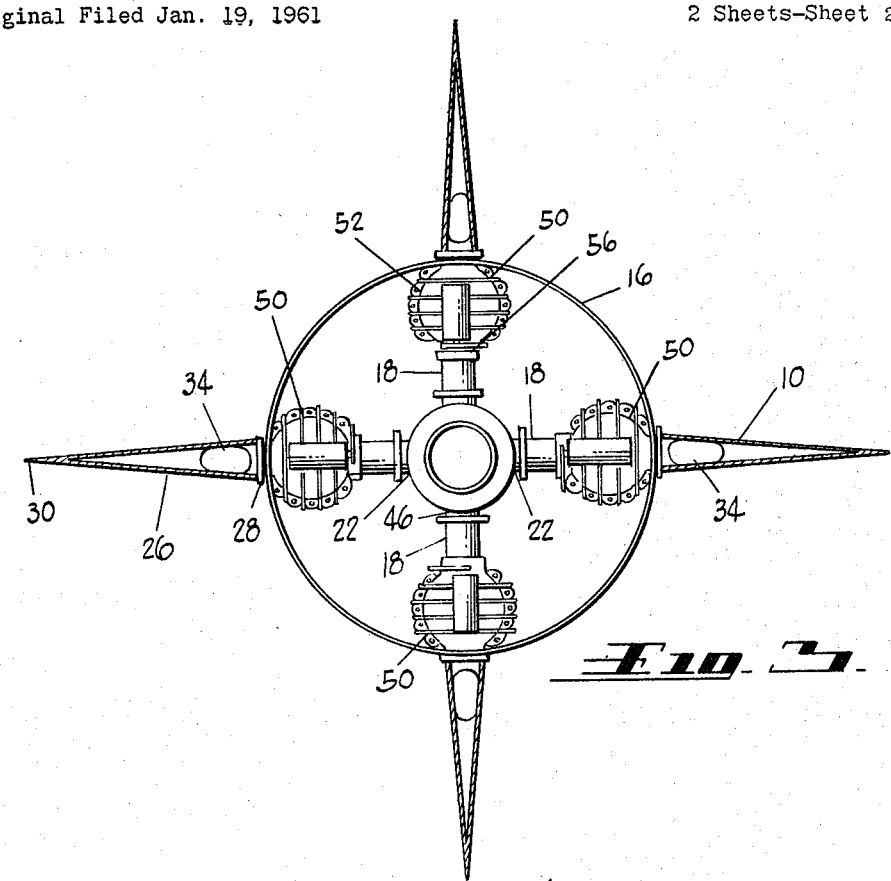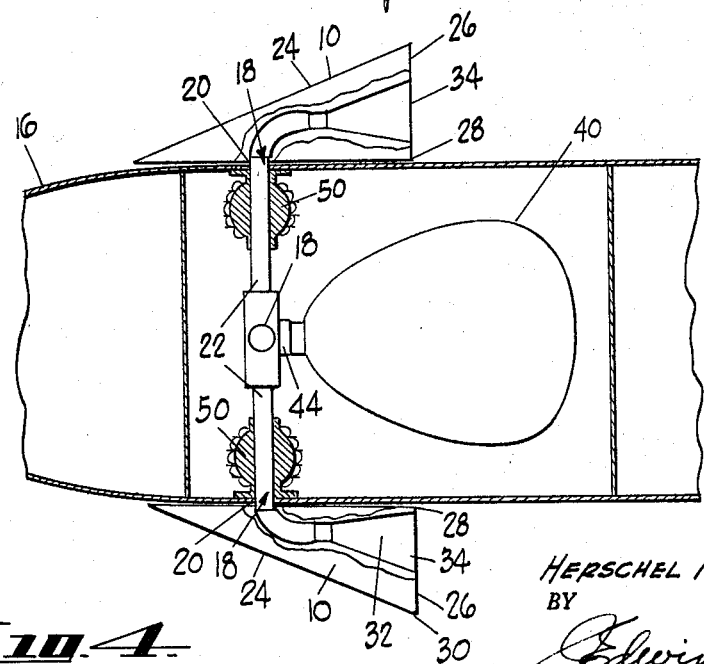

United States Patent Office 3,286,956
Patented Nov. 22, 1966

3,286,956
MISSILE CONTROL SYSTEM
Herschel Nitikman, Chatsworth, Calif., assignor to Douglas Aircraft Company, Inc., Santa Monica, Calif.
Continuation of application Ser. No. 83,830, Jan. 19, 1961. This application July 19, 1965, Ser. No. 477,080
3 Claims. (Cl. 244—14)

This is a continuation of application Serial Number 83,830 filed January 19, 1961, by Herschel Nitikman, and now abandoned.

This invention relates to a missile control system and more particularly to an integrated control system with a common actuation means for reaction or reaction plus aerodynamic control of a multi-phase or multi-stage rocket vehicle.

This control system is generally applicable to the control of a missile operating through a series of aerodynamic conditions such as, from initial conditions of low aerodynamic force through high aerodynamic force and a final regime of low aerodynamic force. These include surface-to-surface and surface-to-air missiles, as well as satellites and escape vehicle booster systems. The applicability is particularly strong for multi-stage solid propellant rockets where all stages except the last are simple boosters with no control functions other than an ignition system on the early stages.

As we reach toward outer space, a system or device must be designed which will provide control of the vehicle over its charted trajectory when the conventional means of such control have been rendered ineffective by the dissipation of the surrounding atmosphere. Heretofore, the trajectory of a rocket vehicle has been controlled, in a conventional manner, by a plurality of movable aerodynamic control surfaces. These surfaces are dependent upon the force of the air striking them for directional control of the vehicle. Therefore, a vehicle projected to a distance from the surface of the earth sufficient to encounter greatly reduced aerodynamic force needs a means of control which is not dependent on the surrounding atmosphere. Accordingly, the present invention provides an integrated control system which includes a control means dependent only upon its own design for operability and not upon the surrounding atmosphere.

Basically, the illustrated embodiment of the invention comprises a plurality of movable aerodynamic control surfaces extending fore and aft of a missile body adjacent to the exterior surface whereof. Each of the surfaces has a relatively flat, pointed forward edge and a relatively thick, blunt trailing edge. A rocket nozzle is mounted within each of the aerodynamic control surfaces and has the mouth thereof directed rearwardly along the blunt edge. A rocket motor having a single outlet is mounted within the missile. The motor including a manifold is attached to the single outlet. The motor is adapted to provide thrust force of greatest magnitude under conditions of reduced aerodynamic forces. A plurality of rotatable hollow shafts is provided, each shaft having a first extremity situated within said missile and a second extremity extending laterally therefrom at a point forward of the center of gravity thereof. Each of the second extremities has a control surface and a rocket nozzle attached thereto and each of the first extremities is attached to one of said manifold ports. A rotation producing actuator is in contact with each of said shafts, control surfaces, and nozzle combinations to produce rotation thereof in response to a predetermined programmed control signal.

Figure 2:
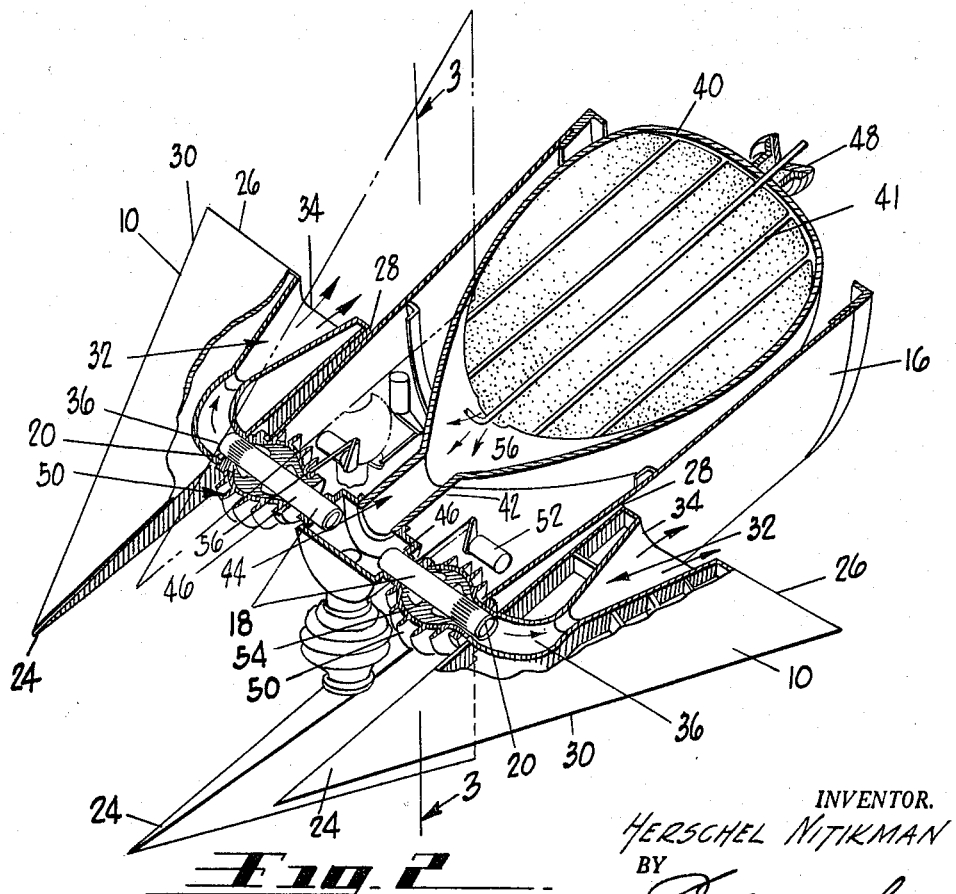

Other advantages of the invention will hereinafter become more fully apparent from the following description of the annexed drawings, which illustrate a single embodiment, and wherein:

FIGURE 1 is a perspective view of a rocket vehicle showing a typical installation of the present invention;
FIG. 2 is a perspective view, partly in section of the essential components of the present invention;
FIG. 3 is a cross-sectional view taken at 3—3 in FIG. 2; and
FIG. 4 is a schematic view of a section of a typical missile showing, in representative form, the principal elements of the present invention.

Referring now to the drawings, wherein like reference characters designate like or corresponding parts throughout the several views, there is shown in FIG. 1 a type of installation for which the present invention is especially adapted but not specifically limited. A plurality of laterally displaced control surfaces 10 extend fore and aft of the forward stage 12 of a typical missile 14 at a point forward of the center of gravity of the missile.

As best seen in FIGS. 2, 3 and 4, the illustrated embodiment of the present invention includes a hollow generally cylindrical missile casing 16 having a plurality of hollow shafts 18 extending laterally therefrom. Said shafts 18 have a first end or extremity 20 extending outward from the missile casing 16 through apertures therein and a second end or extremity 22 extending inward to a point near the longitudinal axis of the casing. Attached to the first end 20, in juxtaposition to the outer surface of said casing, is an aerodynamic control surface 10. The surface 10 is of a conventional shape having a fin-like configuration including a forward edge 24 which is tapered to a point, and a blunt rearward edge 26 which is thickest at the point 28 nearest the missile and tapers to a relatively thin edge 30 at the point on the surface most distant from the casing.

While in the present embodiment of the instant invention, four shafts are shown and described as projecting from the missile casing, it is to be understood that the invention is not to be limited thereto for any number of shafts with their associated control surfaces attached thereto can be used for varying control requirements within the scope of the present invention.

A rocket nozzle 32 is mounted, by conventional means, within each of the control surfaces 10. The nozzles 32 each have a mouth 34 terminating in apertures in the blunt rearward edge 26 of the control surfaces 10. This provides a rearward path for the reaction thrust forces passing through the nozzles. The necks 36 of each of the nozzles 32 are connected to the first end 20 of the shafts 18, thereby forming an uninterrupted passage through the shaft and out the nozzle.

Situated within the missile casing is a rocket canard motor 40. In its illustrated embodiment, the motor 40 has a generally spherical shape and includes a cylindrical throat portion 42. However, the motor is not to be limited specifically thereto for the shape of the motor may be varied within the scope of the present invention. The cylindrical portion 42 is attached to a manifold 44 having four outlet ports 46. Each of the ports 46 is attached to one of the second ends 22 of each of said hollow shafts 18. At the opposite end of said motor from that containing the manifold 44 is a conventional firing device or ignitor 48 for ignition of the fuel contained within the motor 40. In its preferred embodiment, the rocket motor contains a standard solid propellant rocket fuel. The type and configuration of the fuel is dependent upon the desired operation of the system. Herein the motor has been shown to contain laminae 41 of different fuels having varying burning rates. Consequently, by specific configurations of the laminae it is possible to provide rocket motors of different time-thrust characteristics. Therefore, it is possible to control the thrust force of the system as a function of time by specifically configuring fuels of varying burning rates within the motor.

The swivelling of each of the control surfaces and integral nozzle configurations is developed shaft actuator means terminating at the shaft in a finned bearing. Each of the bearing-like members 50 circumscribes one of the shafts 18 and is attached thereto. As depicted herein, the actuator system for each shaft 18 is of a conventional type and includes an electric motor 52, a hollow bulbous journal-like, motor-actuated member 54 attached to each of the shafts 18 and a mechanical linkage 56 attached to the motor 52 and hollow bulbous journal-like, motor actuated member 54 to transmit the rotation of the motor to the shaft 18. However, the actuator should not be specifically limited to the type described above, for other types may be substituted therefor within the scope of appended claims.

In the one embodiment, the present invention operates in the following manner. When the first stage of the missile receives a command to start its motors, that is to ignite the rocket fuel contained within the first stages, the igniter of the rocket canard motor also receives a command electrical signal resulting in the igniter 48 igniting the laminae of fuel 41. The force developed by the burning of the fuel produces a thrust which passes through the manifold 44 and shafts 18 and is directed rearwardly by the jet nozzles 32, thereby assisting the thrust of the first stage of the missile in moving the missile off the launching pad (not shown). As the missile velocity increases as it rises through the atmosphere, the aerodynamic forces striking the control surfaces increase sufficiently to control the trajectory of the missile. By programming or specifically arranging the laminae of the rocket fuel within the canard motor 40, the thrust developed by the motor during the time necessary for the travel of the missile through the earth's atmosphere can be reduced to a minimum. Consequently, the thrust developed by the canard motor will be kept at a minimum until the missile has reached such a height above the surface of the earth that the aerodynamic forces are insufficient to sustain a continuous control through the use of the control surfaces alone. At this time, through the programming of the fuel, the burning rate will increase, thereby increasing the thrust to a maximum, resulting in the directional control of the missile by the thrust forces. To achieve this control, the shafts 18 are rotated in response to commands from a programmer within the missile. The programmer supplies electrical signals to the motor 52 which is thereby caused to turn and moves the linkage 56 and rotatable member 54, resulting in a swivelling of the control surface and nozzle combination thus providing a directional control equivalent to that provided by the control surfaces.

I claim:
1. A missile control system comprising:
   a missile body having a leading portion and a trailing portion;
   said missile body having a plurality of control surfaces, said control surfaces including means pivotally mounting said surfaces on said leading portion of said missile body, said control surfaces having a trailing edge portion;
   a source of pressurized gas located within said missile body;
   reaction thrust producing means located in said control surfaces and formed in said trailing edge portion and adapted to discharge the pressurized gas of said source;
   said reaction thrust producing means communicating with said source through said means pivotally mounting said control surfaces, said pivotal mounting means being conduits; and
   control means located in said missile body for effecting the pivotal movement of said control surfaces thereby changing the direction of source discharge through said reaction thrust producing means, whereby the deviations of pitch, yaw and roll of the missile body are controlled.

2. A missile control system as defined in claim 1 including:
   said source discharging into a common chamber, said common chamber being directly connected to said conduit means pivotally mounting said control surfaces, said common chamber evenly distributing the pressurized gas of said source to said conduit means to assure the balanced control of said missile body.

3. A missile control system as defined in claim 2 including:
   said reaction thrust producing means including a jet portion, said jet portion directing the pressurized gas of said source in the general direction of said missile body trailing portion.

References Cited by the Examiner

UNITED STATES PATENTS 2,995,319  8/1961  Kershner et al. _____ 244—14
3,167,017  1/1965  Sobey _____ 102—50

FOREIGN PATENTS 795,050  5/1958  Great Britain.

BENJAMIN A. BORCHELT, *Primary Examiner.*

W. C. ROCH, *Assistant Examiner.*